United States Patent [19]

Arioka et al.

[11] Patent Number: 4,567,083
[45] Date of Patent: Jan. 28, 1986

[54] MAGNETIC RECORDING MEDIUM

[75] Inventors: Hiroyuki Arioka, Saku; Masaharu Nishimatsu, Komoro; Akio Watanabe, Usuda, all of Japan

[73] Assignee: TDK Corporation, Tokyo, Japan

[21] Appl. No.: 661,499

[22] Filed: Oct. 16, 1984

[30] Foreign Application Priority Data

Oct. 17, 1983 [JP] Japan ............................. 58-192562
Oct. 17, 1983 [JP] Japan ............................. 58-192563

[51] Int. Cl.⁴ .......................................... G11B 5/72
[52] U.S. Cl. ................................. 428/141; 360/134; 360/135; 360/136; 427/44; 427/131; 427/132; 428/143; 428/147; 428/215; 428/216; 428/323; 428/328; 428/329; 428/425.9; 428/694; 428/695; 428/900

[58] Field of Search ............. 428/694, 900, 328, 695, 428/403, 405, 407, 329, 323, 425.9, 215, 41, 143, 216, 147; 427/132, 131, 44, 128; 360/134–135

[56] References Cited

U.S. PATENT DOCUMENTS

| | | | |
|---|---|---|---|
| 4,328,935 | 5/1982 | Steel | 428/329 |
| 4,367,261 | 1/1983 | Miyoshi | 428/330 |
| 4,419,406 | 12/1983 | Isobe | 428/422 |
| 4,427,738 | 1/1984 | Fujiyama | 428/323 |
| 4,442,171 | 4/1984 | Sato | 428/336 |
| 4,443,514 | 4/1984 | Yamamoto | 428/463 |
| 4,450,199 | 5/1984 | Tadokoro | 428/694 |
| 4,451,531 | 5/1984 | Isobe | 428/328 |
| 4,452,863 | 6/1984 | Takizawa | 428/423.7 |
| 4,465,737 | 8/1984 | Miyatuka | 428/339 |

*Primary Examiner*—Ellis P. Robinson
*Attorney, Agent, or Firm*—Seidel, Gonda, Goldhammer & Abbott

[57] ABSTRACT

A magnetic recording medium including a magnetic layer formed on a plastic base and having perpendicular magnetic anisotropy suited for perpendicular magnetization, has a back coating formed on the rear side of the base opposite the magnetic side. The back coating is a thermoset coating cured from a thermosetting composition or a radiation-cured coating cured from radiation-curable composition containing at least one component having at least one acrylic, maleic, or allylic double bond. The back coating has an asperity in the range of 0.04 to 0.6 μm. By suitably selecting the asperity the running quality and output profile are improved.

13 Claims, No Drawings

MAGNETIC RECORDING MEDIUM

FIELD OF THE INVENTION

This invention relates to a magnetic recording medium of the perpendicular magnetization type.

BACKGROUND OF THE INVENTION

Magnetic recording mediums of the perpendicular magnetization type are roughly classified into two groups. One group consists of those having thin metal films and prepared by depositing a thin metal film of Co-Cr, Fe-Ni-Co, Fe-Co or the like by evaporation, sputtering or other technique on a plastic film base, while controlling the metallizing condition so as to form a readily magnetizable axis perpendicular to the base surface. (Refer, e.g., to Japanese Patent Application Publication No. 91/1983.) The other group mediums have coated films and are prepared by dispersing an acicular magnetic powder of any of the abovementioned alloys in a binder resin, supplying the dispersion to a plastic film base, and then subjecting the coating to magnetic field orientation (e.g., Japanese Pat. App. Public Disclosure No. 111832/1982). In any case, this type has a future possibility in that it can record signals of by far the shorter wavelengths than do the conventional magnetic recording mediums having the easily magnetizable axis in parallel with the base surface. The magnetic recording medium of the perpendicular magnetization type must have a surface smooth enough to minimize the spacing between the magnetic head and the magnetic layer surface. However, such a smooth surface increases friction and presents problems of unintended stop during the travel and unwanted output variations due to irregular winding of the tape. With tapes of this character there is a tendency toward reduction in thickness of the base and the magnetic layer. At present, about 10 $\mu$m or thinner bases (e.g., of polyethylene terephthalate, polyethylene naphthalate, polyimides, and polyamides) are under development. These tapes have a soft body and wind too tight on reels. This can lead to deterioration of the tape surface quality with the influence of the rear side properties of the base upon the magnetic coating. Also, adjacent layers of the tape roll can stick together. When the tape is unwound and the base is released out of contact with the magnetic coating of the next tape layer, so-called separation charging can take place, attracting dust and other foreign matter. Sometimes this in turn results in dropouts owing to increased spacing loss. These difficulties have largely offset the advantages of the perpendicular magnetization type magnetic recording medium.

OBJECT OF THE INVENTION

An object of the invention is to provide a magnetic recording medium of the perpendicular magnetization type which has a good running quality and a low variation in output.

Another object of the invention is to provide a magnetic recording medium of the aforesaid type which has a low friction, a high wear-resistance and a low sticking tendency.

A further object of the invention is to provide a magnetic recording medium of the aforesaid type which overcomes the foregoing difficulties, especially such a medium which does not wind too tight.

BRIEF SUMMARY OF THE INVENTION

In accordance with the present invention an excellent magnetic recording medium of the perpendicular magnetization type is provided which includes a magnetic layer of improved surface quality (asperity) which winds less tight with less sticking and runs better with fewer dropouts than the conventional products, by forming back coating selected from a thermoset back coating or a radiation-cured back coating a radiation-cured coating on the rear side of a plastic base, opposite the front side on which a perpencicular magnetization type magnetic layer is formed, in such a manner that the asperity (roughness) of the back coating is controlled within the range of 0.04–0.6 $\mu$m, said thermoset back coating being one cured from a thermosetting composition caontaining a vinyl chloride-vinyl acetate-vinyl alcohol copolymer, a polyurethane resin and a polyisocyanate with or without addition of nitrocellulose or additives, said radiation-cured coating being one cured from a radiation-curable composition containing one or more components having at least one acrylic, maleic or allytic double bond. The back coating may contain a further additives. The term "radiation" in this specification is used to mean an ionizing ray such as $\gamma$-rays and $\beta$-rays which irradiates the radiation-curable resin to form a radical from the double bond.

DETAILED EXPLANATION OF THE INVENTION

Good asperity of the back coating combines with its material to not only improve the running quality and wear resistance of the tape but lessens the frequencies of sticking of the back coating to the magnetic layer and of cinching. Further, it has been found that a good signal-to-noise ratio is attained when the asperity of the back coating is not more than 0.6 $\mu$m while the magnetic layer possesses a high surface quality with an asperity of not more than 0.08 $\mu$m. If the asperity of the back coating is below 0.04 $\mu$m, cinching or objectionable sticking or running property will result.

The proportions of the binder ingredients to be used in the back coating may be varied over a broad range. Usually, the vinyl chloride-vinyl acetate-vinyl alcohol copolymer and the polyurethane are mixed in proportions of 10–80% by weight of the former and the balance the latter. The polyisocyanate is added in an amount of 5–80 parts by weight on the basis of the total amount of the resins as 100 parts.

When nitrocellulose is to be added to the above binder composition, adequate proportions are 15–60% each of the nitrocellulose and the vinyl chloride-vinyl acetate-vinyl alcohol copolymer and 10–70% of the polyurethane, all by weight (the total amount being 100%). The polyisocyanate may be added in an amount of 5–80 parts by weight on the basis of the total resin amount as 100. The addition of nitrocellulose reduces the stickiness and improves the wear resistance of the resulting back coating. Also, the back coating surface can be smoothened by calendering after curing treatment.

The filler to be used, together with the abovementioned binders, in the back coating according to the invention is one of electrically conductive fillers 1), such as graphite and carbon black, or inorganic fillers 2), such as $SiO_2$, $TiO_2$, $Al_2O_3$, $Cr_2O_3$, SiC, $CaCO_3$, zinc oxide, goethite, $\alpha Fe_2O_3$, talc, kaolin, $CaSO_4$, boron nitride, Teflon powder, graphite fluoride, and molybdenum disulfide. Such a filler, chosen from 1), is used at a rate of 20–200 parts per 100 parts of the binder weight, or a filler, chosen from 2), is used at a rate of 10–300 parts per the same binder weight. An excessive filler proportion will embrittle the coated film, rather increasing the number of dropouts.

When a thermosetting resin is used in forming the back coating, the coat immediately after the winding of the tape is yet to be cured completely. Complete curing of the resin, which would require a considerable quantity of energy, must actually be effected slowly because of its bearing upon the base. During this, the surface quality and the resin ingredient of the back coating are printed through to some degree to the magnetic layer or to the base surface when the latter is not coated yet with the magnetic material. The result is unfavorable effects upon the mating surfaces, or the back coating and the magnetic or base surfaces. In the case of perpendicular application, the transfer of the back coating properties to the magnetic layer poses a problem of undesired output variation or output drop. Unlike horizontal application, the perpendicular technique allows the magnetic particles to be oriented perpendicularly and therefore, in the absence of the back coating, it will tend to produce minute surface irregularities on cinching and hence output fluctuations. The back coating, when provided, can have more surface irregularities under the both of the aforesaid influences than those of the conventional horizontally coated mediums.

The back coating applied in accordance with the invention which contains a radiation-curable or sensitive resin can be completely cured by exposure to radiation before being taken up on a reel. Also, the back coating surface can be smoothened by calendering or other treatment before or after, or simultaneously with, the curing. The treatment imparts desirable surface properties to both the back coating and magnetic surfaces. Consequently, there occurs no excessively tight winding or output fluctuation. Radiation curability is much beneficial to perpendicular coating.

The radiation-curable or sensitive resin to be employed in the present invention is one containing at least one unsaturated double bond in the molecular chain and which undergoes crosslinking with radicals generated upon exposure to radiation. It can also be obtained by radiation-sensitizing a thermoplastic resin.

Radiation sensitization is effected, for example, by introduction, into the molecules of a given resin, groups that are crosslinked or polymerized and dried by subjection to radiation, such as the acrylic double bonds of acrylic or methacrylic acid or an ester of either acid having radically polymerizable unsaturated double bonds, the allylic double bonds of diallyl phthalate or the like, or the unsaturated bonds of maleic acid or a maleic acid derivative.

Other unsaturated double bonds may be employed as well if they are crosslinkable or polymerizable by exposure to radiation.

The thermoplastic resins that can be modified to be radiation-sensitive resins include the following.

(I) Vinyl Chloride-Based Copolymers

Vinyl chloride-vinyl acetate-vinyl alcohol copolymer, vinyl chloride-vinyl alcohol copolymer, vinyl chloride-vinyl alcohol-vinyl propionate copolymer, vinyl chloride-vinyl acetate-maleate copolymer, and vinyl chloride-vinyl acetate-OH-terminated alkyl-side-chain copolymer, e.g., the products marketed by Union Carbide Corp. of the U.S. under the trade designations "VROH", "VYNC", "VYEG-X", and "VERR".

The abovementioned copolymers radiation-sensitized by introduction of an acrylic, maleic-acid, or allylic double bond or bonds by techniques to be described later.

(II) Saturated Polyester Resins

Saturated polyester resins obtained by ester linkage of a saturated polybasic acid, such as phthalic, isophthalic, terephthalic, succinic, adipic, or sebacic acid, with a polyhydric alcohol, such as ethylene glycol, diethylene glycol, glycerin, trimethylolpropane, 1,2-propylene glycol, 1,3-butanediol, dipropylene glycol, 1,4-butanediol, 1,6-hexanediol, pentaerythritol, sorbitol, neopentyl glycol, or 1,4-cyclohexane dimethanol. Those polyester resins may be modified with $SO_3Na$ or the like to improve their affinities for magnetic particles (e.g., "Vyron 53s"). The above-mentioned resins radiation-sensitized by techniques to be described later.

(III) Unsaturated Polyester Resins

Polyester compounds containing a radiation-curable, unsaturated double bond or bonds in the molecular chain. Examples are unsaturated polyester resins, their prepolymers, and oligomers, having at least one radiation-curable, unsaturated double bonds, which consist of a saturated polyester resin formed by ester linkage of a polybasic acid classified as a thermoplastic resin in (II) above and a polyhydric alcohol, with part of the polybasic acid being replaced by maleic acid.

The polybasic acid and polyhydric alcohol ingredients of the saturated polyester resins may be any of the compounds mentioned in (I) above, and the radiation-curable, unsaturated double bond may be that of maleic acid, fumaric acid, or the like.

The radiation-curable, unsaturated polyester resin is made in the usual manner from at least one type each of polybasic acid and polyhydric alcohol ingredients with the addition of maleic acid, fumaric acid, or the like. In the presence of a catalyst the starting material mixture is allowed to react for dehydration or dealcoholation in a nitrogen atmosphere at a temperature in the range of 180–200° C., and, following the conclusion of the reaction, the temperature is raised to 240°–280° C., and then condensation is effected under reduced pressure of 0.5–1.0 mmHg to obtain the objective polymer resin. The content of maleic, fumaric, or other acid in the starting mixture is in the range of 1–40 mol %, preferably in the range of 10–30 mol %, in the total acid amount for the facility of crosslinking and for desirable radiation curability during the course of manufacture of the magnetic recording medium.

(IV) Polyvinyl Alcohol Resins

Polyvinyl alcohol, butyral resin, acetal resin, formal resin, and their copolymers. The abovementioned resins whose hydroxyl groups are radiation-sensitized by techniques to be described later.

(V) Epoxy and Phenoxy Resins

Epoxy resins formed by the reaction of bisphenol A with epichlorohydrin or methylepichlorohydrin, e.g., those marketed by Shell Chemical under the trade designations "Epikote 152", "-154", "-828", "-1001", and "-1007", Dow Chemical's "DEN 431", "DER 732", "-511", and "-331", and Dainippon Ink & Chemicals' "Epichlon 400" and "-800". Also, the resins obtained by polymerizing the above epoxy resins to higher degrees, e.g., UCC's phenoxy resins trademarked "PKHA", "PKHC", and "PKHH", and brominated bisphenol A-epichlorohydrin copolymers, such as Dainippon Ink's "Epichlon 145", "-152", "-153", and "-1120" are effective.

The abovementioned resins whose epoxy groups have been utilized in their radiation sensitization.

(VI) Cellulose Derivatives

Cellulose derivatives of varying molecular weights too are effective as thermoplastic resin ingredients for use in the present invention. Among these, particularly effective are nitrocellulose, cellulose acetobutyrate, ethyl cellulose, butyl cellulose, and acetyl cellulose. The abovementioned resins radiation-sensitized by techniques to be described later, by utilizing their hydroxyl group contents.

Other resins which may be effectively radiation-sensitized include polyfunctional polyester resins, polyether ester resins, polyvinyl pyrrolidone resins, and their derivatives (PVP-olefin copolymers), polyamide resins, polyimide resins, phenol resins, spiro-acetal resins, and acrylic resins containing at least one of hydroxyl-containing acrylic or methacrylic esters.

Blending such a radiation-sensitized thermoplastic resin with a thermoplastic elastomer or prepolymer will give a coated film tougher than that of the former alone. Even a greater effect will be achieved by the use of an elastomer or prepolymer likewise radiation-sensitized in advance. The elastomers or prepolymers which may be combined with the radiation-sensitive resins are as follows.

(I) Polyurethane Elastomers, Prepolymers, and Telomers

Polyurethane elastomers are particularly useful because of their good wear resistance and adhesion to the PET film base.

As such urethane compounds, effective are polyurethane elastomers, prepolymers, and telomers which consist of polycondensates of an isocyanate, chosen from among various polyisocyanates, such as toluene-2,4-diisocyanate, toluene-2,6-diisocyanate, xylene-1,3-diisocyanate, xylene-1,4-diisocyanate, naphthalene-1,5-diisocyanate, m-phenylenediisocyanate, p-phenylenediisocyanate, 3,3'-dimethyl-4, 4'-diphenylmethanediisocyanate, diphenylmethane-4,4'-diisocyanate, dimethyl-3,3'-biphenylene diisocyanate, biphenylene-4,4'-diisocyanate, hexamethylene diisocyanate, isophorone diisocyanate, dicyclohexylmethane diisocyanate, "Desmodur L", and "-N", and a linear saturated polyester (formed by polycondensation of a polyhydric alcohol, such as ethylene glycol, diethylene glycol, glycerin, trimethylolpropane, 1,4-butanediol, 1,6-hexanediol, pentaerythritol, sorbitol, neopentyl glycol, or 1,4-cyclohexane dimethanol, and a saturated polybasic acid, such as phthalic, isophthalic, terephthalic, succinic, adipic, or sebacic acid), linear saturated polyether (polyethylene glycol, polypropylene glycol, or polytetramethylene glycol), or one of various other polyesters, such as caprolactam, or hydroxyl-containing acrylic or methacrylic ester.

While it is not objectionable to combine such an elastomer directly with one of the aforementioned radiation-sensitizable, thermoplastic resins, a marked improvement in the effectiveness will be achieved by radiation sensitization of the combination through a further reaction with a monomer having at least one acrylic or allylic double bond reactive with the isocyanate or hydroxyl group at the end of the molecular chain of the urethane elastomer.

(II) Acrylonitrile-Butadiene Copolymer Elastomers

The acrylonitrile-butadiene copolymer prepolymer having an end hydroxyl group that is commercially available as Sinclair Petrochemicals' "Poly-BD Liquid Resin" or Nippon Zeon's "Hycar 1432J" or the like is particularly suitable as an elastomer ingredient in which the double bond in butadiene produces radicals upon irradiation for crosslinking and polymerization.

(III) Polybutadiene Elastomers

Sinclair Petrochemicals' "Poly-BD Liquid Resin R-15" or suchlike low-molecular-weight, end-hydroxyl-containing prepolymer is particularly desirable because of its compatibility with the thermoplastic resin. The prepolymer "R-15", whose molecule terminates with a hydroxyl group, can attain enhanced radiation sensitivity by the addition of an acrylic double bond to the end of the molecule. This adds to the usefulness of the resulting binder.

Cyclized polybutadienes, e.g., Japan Synthetic Rubber's "CBR-M901", may also be combined with the thermoplastic resin to attain improved performance. They permit particularly efficient crosslinking or polymerization upon irradiation owing to the unsaturated bond radicals inherent to the polybutadiene, thus imparting excellent properties to the binder.

Among other suitable thermoplastic elastomers and their prepolymers, styrene-butadiene rubber, chlorinated rubber, acrylic rubber, isoprene rubber, and their cyclization products (e.g., Japan Synthetic Rubber's "CIR 701"), epoxy-modified rubber, internally plasticized, saturated linear polyester (e.g., Toyobo's "Vylon #300") and other similar elastomers may be advantageously subjected to radiation sensitization.

Next, examples of synthesizing radiation-sensitive binders will be given below.

PROCESS FOR PREPARING AN ADDUCT OF TOLYLENE DIISOCYANATE (a) Synthesis of Acrylic Modification Product of Vinyl Chloride-Vinyl Acetate Copolymer Resin (Radiation-Sensitive Resin)

A five-liter, four-necked flask is charged with 750 parts "Vinylite VAGH", 1250 parts toluene, and 500 parts cyclohexane. The charge is dissolved with heat, the temperature is increased to 80° C., and 61.4 parts 2-hydroxyethyl methacrylate adduct of tolylene diisocyanate is added. After the further addition of 0.012 part each tin octylate and hydroquinone, the whole mixture is allowed to react at 80° C. in an $N_2$ stream until an NCO reaction rate of 90% is reached. After the reaction, the product is cooled and diluted with 1250 parts methyl ethyl ketone.

[Process for Preparing A 2-Hydroxyethyl Methacrylate (2HEMA) Adduct of Tolylene Diisocyanate (TDI)]

In a one-liter, four-necked flask, 348 parts tolylene diisocyanate was heated to 80° C. in an $N_2$ stream. To this isocyanate were added 260 parts 2-hydroxyethyl methacrylate, 0.07 part tin octylate, and 0.05 part hydroquinone dropwise while controlling the reactor temperature within the range of 80°–85° C. After the addition, the mixture was stirred at 80° C. for 3 hours to conclude the reaction. Following the conclusion of the reaction, the product was taken out and cooled to obtain a 2HEMA of TDI as a white paste.

(b) Synthesis of Acrylic Modification Product of Butyral Resin (Radiation-Sensitive Resin)

One hundred parts "BM-S", a butyral resin marketed by Sekisui Chemical Co., is charged, together with 191.2 parts toluene and 1.4 parts cyclohexanone, into a five-liter, four-necked flask and is dissolved with heat. The temperature is increased to 80° C., 7.4 parts of the 2-hydroxyethyl methacrylate adduct of tolylene diisocyanate and then 0.015 part each tin octylate and hydroquinone are added. The mixture is allowed to react at 80° C. in an $N_2$ stream to an NCO reaction rate of at least 90%. After the conclusion of the reaction, the product is cooled and diluted with methyl ethyl ketone.

(c) Synthesis of Acrylic Modification Product of Saturated Polyester Resin (Radiation-Sensitive Resin)

One hundred parts "Vylon RV-200" of Toyobo is dissolved by heating in 116 parts each toluene and methyl ethyl ketone. The temperature is raised to 80° C., 3.55 parts 2HEMA adduct of TDI is added, 0.007 part each tin octylate and hydroquinone are further added, and the mixture is allowed to react at 80° C. in an $N_2$ stream to an NCO reaction rate of not less than 90%.

(d) Synthesis of Acrylic Modification Product of Epoxy Resin (Radiation-Sensitive Resin)

Four hundred parts "Epikote 1007" of Shell Chemical is dissolved with heat in 50 parts each toluene and MEK, 0.006 part N-dimethylbenzylamine and 0.003 part hydroquinone are added, the temperature is increased to 80° C., 69 parts acrylic acid is added dropwise, and the whole mixture is allowed to react at 80° C. until the acid value reaches 5 or less.

(e) Synthesis of Acrylic Modification Product of Urethane Elastomer (Radiation-Sensitive Elastomer)

A reactor is charged with 250 parts urethane prepolymer of isocyanate-terminated diphenylmethane diisocyanate (MDI) ("Nippollan" marketed by Nippon Polyurethane), 32.5 parts 2HEMA, 0.07 part hydroquinone, and 0.009 part tin octylate. The charge is dissolved by heating to 80° C., 43.5 parts TDI is added dropwise while the reactor is being cooled so that the temperature inside is kept within the range of 80°–90° C., and, after the dropping, the mixture is allowed to react at 80° C. until an NCO reaction rate of 95% or more is reached.

(f) Synthesis of Acrylic Modification Product of Polyether-Type End-Urethane Modified Elastomer (Radiation-Sensitive Elastomer)

A reactor is charged with 250 parts polyether "PTG-500" of Nippon Polyurethane, 32.5 parts 2HEMA, 0.007 part hydroquinone, and 0.009 part tin octylate. The charge is dissolved by heating at 80° C., and 43.5 parts TDI is added dropwise while being cooled so that the temperature inside the vessel is in the range of 80°–90° C. After the addition, the whole mixture is caused to react until an NCO reaction rate of not less than 95% is attained.

(g) Synthesis of Acrylic Modification Product of Polybutadiene Elastomer (Radiation-Sensitive Elastomer)

Into a reactor are placed 250 parts "Poly-BD Liquid Resin R-15", a polybutadiene having a low molecular weight and end hydroxyl groups marketed by Sinclair Petrochemicals, 32.5 parts 2HEMA, 0.007 part hydroquinone, and 0.009 part tin octylate. After the contents have been dissolved by heating at 80° C., 43.5 parts TDI is dropped while being cooled to maintain the temperature inside the reactor in the range of 80°–90° C. After the addition, the mixture is allowed to react up to an NCO reaction rate of 95% or more.

It is well-known that some polymers disintegrates upon exposure to radiation and the others undergo crosslinking of their molecules. The latter include polyethylene, polypropylene, polystyrene, polyacrylate, polyacrylamide, polyvinyl chloride, polyester, polyvinyl pyrrolidone rubber, polyvinyl alcohol, and polyacrolein. These crosslinking polymers may be directly utilized as radiation-crosslinkable, back coating resins because they undergo the crosslinking reaction without the prior modification as described above.

Non-solvent type resins which do not use any solvent are also useful for back coating because they can be cured within a short time in accordance with the invention.

As regards the active energy rays for use in crosslinking the back coating according to the invention, the electron beams from an electron-beam accelerator as the source, $\gamma$-rays from $Co^{60}$, $\beta$-rays from $Sr^{90}$, X-rays from an X-ray generator, or the like may be employed.

Above all, as the radiation source, radiant rays from a radiation heater is advantageously utilized because of the ease of controlling the absorbed dose, incorporation into the process line, and other considerations such as shieldability from the ionizing radiation.

As for the characteristics of the radiation to be used in curing the back coating, it is desirable from the viewpoint of transmissivity to choose a radiation accelerator which operates with an acceleration voltage of 100–750 kV, preferably 150–300 kV, and effect the irradiation so that the absorbed dose may range from 0.5 to 20 megarads.

In curing the back coating of the invention, the low-dosage type radiation accelerator manufactured by Energy Science Co. of the U.S. (trademarked "Electrocurtain system") or the equivalent is extremely advantageous because of the ease with which the accelerator can be installed on the tape coating line and the shieldability against secondary X-rays inside the apparatus.

It should be clear to those skilled in the art that the Van de Graaff accelerator in extensive use as a radiation accelerator may be employed instead.

For radiation crosslinking it is important to expose the back coating to radiation in a stream of an inert gas, such as $N_2$ or $H_2$ gas. Irradiation in air is very disadvantageous because $O_3$ and the like formed by the irradiation of the binder ingredient hamper the action of the radicals generated in the polymer to effect the crosslinking reaction favorably.

Therefore, it is essential that the atmosphere in which the coating is to be exposed to active energy rays be of an inert gas, such as $H_2$, He, or $CO_2$, with an oxygen concentration of at most 1%.

In practicing the invention, a monomer having a sufficiently high boiling point to remain unevaporated after the removal of low-boiling solvents by predrying may be used. Appropriate examples are alkyl esters (Hexyl, 2-ethylhexyl, lauryl, decyl, and stearly esters) having six or more oxygen atoms of acrylic or methacrylic acid, and high-boiling hydroxyacrylates or hydroxymaleates, such as 2-hydroxypropyl acrylate, 4-hydroxybutyl acrylate, 2-hydroxyethyl methacrylate, 6-hydroxyhexyl methacrylate, mono(2-hydroxyethyl)-maleate, di(2-hydroxyethyl) maleate, acrylamides, and methacrylamides. To promote the crosslinking, such a monomer may be used even more effectively together with a high-boiling monomer having two or more vinyl groups, e.g., divinyl styrene, ethylene glycol dimethacrylate, triethylene glycol dimethacrylate, tetraethylene glycol dimethacrylate, N,N'-methylenebisacrylamide, 1,3-butylene dimethacrylate, diallyl phthalate, trimethylolpropane tri(meth)acrylate, or pentaerythritol tri(meth)acrylate.

A filler may similarly be used, together with the abovementioned binders, in the back coating according to the invention and may include one of electrically conductive fillers (1), such as graphite and carbon black, or inorganic fillers (2), such as $SiO_2$, $TiO_2$, $Al_2O_3$, $Cr_2O_3$, SiC, $CaCO_3$, zinc oxide, goethite, $\alpha Fe_2O_3$, talc, kaolin, $CaSO_4$, boron nitride, Teflon powder, graphite fluoride, and molybdenum disulfide. Such a filler, chosen from (1), is used at a rate of 20-200 parts per 100 parts of the binder weight, or a filler, chosen from (2), is used at a rate of 10-300 parts per the same binder weight. An excessive filler proportion will embrittle the coated film, rather increasing the number of dropouts.

Magnetic Layer 1

A magnetic ink material consisting of

| A magnetic ink material consisting of barium ferrite, in the form of 0.02 μm-thick hexagonal plates, 0.1 μm in particle size | 80 parts by weight |
|---|---|
| polyurethane acrylate | 10 parts by weight |
| polyester acrylate | 7 parts by weight |
| trimethylolpropane triacrylate | 3 parts by weight | was mixed on a three-roll mill to prepare an electron-ray-curable ink.

This ink was applied to a polyester film, the resulting coat was covered with a polypropylene film, and the sandwich was placed in an orienter for perpendicular orientation. Concurrently, the sandwich inside the orienter was irradiated by a 150-keV (15-mA) curtain type electron gun to a dose of 5 Mrads to polymerize and cure the binder. The polypropylene film was thereafter peeled off.

Magnetic Layer 2

A polyester film was thoroughly washed, degreased, and dried, and a low-coercive force material layer of a Mo-Fe-Ni alloy was formed by sputtering on the film base. As for the layer-forming conditions, the sputtering was performed for about 20 minutes at a vacuum degree of $1.5 \times 10^{-7}$ torr and argon pressure of $2.2 \times 10^{-2}$ torr with a high-frequency power supply of 650 W and at a base temperature of 250° C. The low-coercive force material layer thus formed had a film thickness of about 1 μm, coercive force (Hc) of about 5 Oe, and saturation magnetization (Ms) of about 600 G. Over this layer was formed by sputtering a magnetic recording layer of a Co-Cr alloy. The sputtering was carried out at a vacuum degree of $1.5 \times 10^{-7}$ torr and argon pressure of $2 \times 10^{-2}$ torr with a high-frequency power supply of 200 W for about one hour. The magnetic recording layer so formed had a film thickness of about 1 μm, Cr content of about 18 wt %, coercive force (Hc) perpendicular to the film surface of about 1500 Oe, and saturation magnetization (Ms) of 390 G.

Magnetic Layer 3

A polyester film was thoroughly washed, degreased, and dried, and a low-coercive force material layer of a Mo-Fe-Ni alloy was formed by sputtering on the film base. As for the layer-forming conditions, the sputtering was performed for about 20 minutes at a vacuum degree of $1.5 \times 10^{-7}$ torr and argon pressure of $2.2 \times 10^{-2}$ torr with a high-frequency power supply of 650 W and at a base temperature of 250° C. The low-coercive force material layer thus formed had a film thickness of about 1 μm, coercive force (Hc) of about 5 Oe, and saturation magnetization (Ms) of about 600 G. Over this layer was formed by sputtering a magnetic recording layer of a Co-Cr alloy. The sputtering was carried out at a vacuum degree of $1.5 \times 10^{-7}$ torr and argon pressure of $2 \times 10^{-2}$ torr with a high-frequency power supply of 200 W for about one hour. The magnetic recording layer so formed had a film thickness of about 1 μm, Cr content of about 18 wt %, coercive force (Hc) perpendicular to the film surface of about 650 Oe, and saturation magnetization (4 πMs) of 4800 G.

EXAMPLE 1

A resin composition consisting of

|  | parts by weight |
|---|---|
| $CaCO_3$ (40 mμ) | 70 |
| vinyl chloride-vinyl acetate-vinyl alcohol copolymer ("VAGH") | 30 |
| polyurethane prepolymer ("Desmocoll 22") | 20 |
| methyl ethyl ketone/toluene (50/50) | 300 |
| stearic acid | 5 |
| stearyl stearate | 2 | was mixed to prepare a back coating material. To this mixture 30 parts by weight of a polyisocyanate ("Desmodur L") was added, and the whole mixture was applied to the rear side of the polyester film, opposite the magnetic layer 1, to form a one-micron-thick coat. The coat was dried, calendered, and thermally cured. The resulting tape was slitted to obtain video tapes.

The asperities of the magnetic and back coating layers were adjusted through control of the calendering, so that the magnetic layers were not thicker than 0.08 μm and the back coating layers were 0.05 to 0.6 μm thick.

EXAMPLE 2

A back coating composition consisting of

|  | Parts by weight |
|---|---|
| nitrocellulose ("Nitrocellulose" mfd. by Daicell Ltd.) | 30 |
| carbon black (25 mμ) | 30 |
| $Al_2O_3$ | 20 |
| vinyl chloride-vinyl acetate-vinyl alcohol copolymer ("VAGH") | 30 |
| polyurethane prepolymer ("Desmocoll 22") | 40 |
| methyl ethyl ketone/toluene (50/50) | 400 |

| | Parts by weight |
|---|---|
| stearic acid | 5 |
| stearyl stearate | 2 | was prepared. In the same manner as described in Example 1, the composition was applied to the rear side of the polyester film having the magnetic layer 2 on the front, so as to form a back coating.

COMPARATIVE EXAMPLE 1

The procedure of Example 1 was repeated except that the "VAGH" in the back coating was replaced by 25 parts of the polyurethane prepolymer, and comparative tapes were made.

COMPARATIVE EXAMPLE 2

A magnetic recording medium having the magnetic layer 1 (but without any back coating).

COMPARATIVE EXAMPLE 3

A magnetic recording medium having the magnetic layer 2 (but without any back coating).

Results

With the products of Examples and Comparative Examples various measurements and tests were made. The results are tabulated below:

| Sample | Asperity (μm) Back coatg | Asperity (μm) Mag. lyr | Fric. coeff. Back coatg | Fric. coeff. Mag. lyr | Cinth-ing | Wear Back coatg | Stick-ing | Elec. charac. (7 MHz) Y-S/N | Elec. charac. (7 MHz) Envelope (dB) |
|---|---|---|---|---|---|---|---|---|---|
| w/Magnetic layer 1: | | | | | | | | | |
| Ex. 1 | 0.18 | 0.05 | 0.20 | 0.26 | E | E | E | 0 | 5 |
| Comp Ex. 1 | 0.21 | 0.08 | 0.31 | 0.27 | G | F | F | −1.5 | 2 |
| Comp Ex. 2 | 0.07 | 0.08 | 0.58 | 0.26 | P | — | P | −0.8 | 2 |
| w/Magnetic layer 2: | | | | | | | | | |
| Ex. 2 | 0.25 | 0.04 | 0.20 | 0.30 | E | E | E | 0 | 5 |
| Comp Ex. 3 | 0.06 | 0.07 | 0.70 | 0.31 | P | — | P | −0.9 | 2 |

Notes:
E = Excellent; G = Good; F = Fair; and P = Poor.
The electric characteristics are evaluated on the basis of the results attained in Examples 1 and 2 as 0 dB. The envelopes are rated by the five-mark method, "5" being the best.

EXAMPLE 3

A mixture consisting of

| | |
|---|---|
| carbon black (25 mμ) | 60 parts by weight |
| acrylic-modified vinyl chloride-vinyl acetatevinyl alcohol copolymer (a) [prepared by the method (a) above] | 30 parts by weight |
| acrylic-modified polyurethane elastomer (e) | 20 parts by weight |
| mixed solvent (MIBK/toluene = 1/1) | 300 parts by weight | was mixed on a ball mill for five hours. The mixture was applied to the rear side of the polyester film opposite the magnetic layer 1, so as to form a coat 3 μm thick on drying. The back coating so formed was cured by exposure to electron rays, using an Electro-curtain type accelerator, in N₂ gas with an acceleration voltage of 150 keV and electrode current of 15 mA to an absorbed dose of 5 Mrads. The resulting tape was calendered and slitted into ½"-wide video tapes.

EXAMPLE 4

A mixture consisting of

| | |
|---|---|
| SiO₂ (0.1 μm) | 50 parts by weight |
| acrylic-modified vinyl chloride-vinyl acetate-vinyl alcohol copolymer (a) | 30 parts by weight |
| acrylic-modified polyurethane elastomer (e) | 20 parts by weight |
| mixed solvent (MIBK/toluene = 1/1) | 300 parts by weight | was applied in the same manner as in Example 1 to the rear side of the polyester film already coated on the front side with the magnetic layer 2, and samples were made.

COMPARATIVE EXAMPLE 4

A mixture consisting of

| | |
|---|---|
| carbon black (25 mμ) | 50 parts by weight |
| vinyl chloride-vinyl alcohol copolymer | 30 parts by weight |
| polyurethane prepolymer | 20 parts by weight |
| mixed solvent (MIBK/toluene = 1/1) | 300 parts by weight | was mixed on a ball mill for five hours. The mixture was applied to the rear side of the polyester film opposite the magnetic layer 1, so as to form a coat 3 μm thick on drying. After calendering, the tape was wound on a reel, cured at 60° C. for 24 hours, and slitted into ½"-video tapes.

COMPARATIVE EXAMPLE 5

A mixture consisting of

| | |
|---|---|
| SiO₂ (0.1 μm) | 50 parts by weight |
| vinyl chloride-vinyl alcohol copolymer | 30 parts by weight |
| polyurethane prepolymer | 20 parts by weight |
| mixed solvent (MIBK/toluene = 1/1) | 300 parts by weight | was applied in the same manner as in Comparative Example 1 to the rear side of the polyester film having the magnetic layer 2 on the front side to obtain samples.

COMPARATIVE EXAMPLE 6

The polyester film base having the magnetic layer 3 (but without any back coating).

The tapes of the foregoing Examples and Comparative Examples were subjected to varied tests. The results are summarized in the following table.

3. Wear of Back Coating

Each test tape, held in a cassette, was allowed to run 100 times from end to end on a commercially available VHS type VTR in environments of 40° C. and 80% RH. The interior of the cassette housing was inspected; the rating was "P" when it was contaminated and "E" or "G" when it was clean.

4. Sticking of Magnetic Layer and Back Coating

| | Results | | | | | | | | | |
|---|---|---|---|---|---|---|---|---|---|---|
| | Asperity (μm) | | Fric. coeff. | | Running durability | | | | Elec. charac. (7 MHz) | |
| | | | | | | Wear | | | | |
| Sample | Back coatg | Magne layer | Back coatg | Magne. layer | Cinthing | Back coatg | Magne. layer | Sticking | Y-S/N | Envelope (dB) |
| w/Magne. layer 1: | | | | | | | | | | |
| Ex. 3 | 0.15 | 0.03 | 0.19 | 0.25 | E | E | E | E | 0 | 5 |
| Comp. Ex. 4 | 0.18 | 0.08 | 0.20 | 0.26 | E | E | P | F | −2.0 | 2 |
| w/Magne. layer 3: | | | | | | | | | | |
| Ex. 4 | 0.14 | 0.02 | 0.17 | 0.30 | E | E | E | E | 0 | 5 |
| Comp. Ex. 5 | 0.20 | 0.08 | 0.20 | 0.30 | E | E | P | F | −2.5 | 2 |
| Comp. Ex. 6 | 0.06 | 0.04 | 0.70 | 0.31 | P | — | F | P | −2.0 | 2 |

Notes:
The electric characteristics are evaluated on the basis of the results attained in Examples 1 and 2 as 0 dB.
The envelopes are rated by the five-mark method, "5" being the best.
Durability ratings: E = Excellent; G = Good; F = Fair; and P = Poor.

In the case of perpendicular coating, the perpendicularly oriented magnetic particles tend to develop minute projections on the coating surface when the tape is wound too tight. They are minute but are subject to more load per unit area than the horizontally oriented particles when they come into contact with the head, guideposts, and the like while the tape is running, and hence they tend to be broken away. To avoid this, it is necessary to preclude the excessively tight winding on the magnetically coated side. The back coatings of the present invention are advantageous to attain this end. Without the back coating, the friction would be great enough to bring the tape to a stop.

Also, the back coating formed in conformity with the invention is free of cinching, wear, or sticking.

As for the properties of the recording medium, the measurements and evaluations were made in the following way.

1. Friction Coefficient

Each length of test magnetic tape was extended, with its back coating inside, around a 4 mm-dia. aluminum column polished on the surface, through a contact angle of 180°. The tape was transported at a speed of 2 cm per second, the tensions on the supply and take-up sides were measured, and the coefficient of friction was calculated from the measured values.

2. Cinching

On a commercially available video tape recorder of the VHS type, each test tape was caused to run fast forward to the end and then backward. At a point 50 meters short of the other end, the tape was once stopped and then driven back quickly to the last. After the rewinding, the tape roll condition was visually inspected. The tape wound up in sound condition without interlayer spacing was rated "E" or "G" and the tape having interlayer spaces was rated "P".

Each test tape was taken up on a VHS reel allowed to stand at 60° C. for five days, and the sticking condition was visually evaluated. When there occurred no sticking the result was "E" or "G" and when there was evidence of sticking the rating was "P".

5. Asperity

The asperity was determined by the 20-mark averaging method from a chart drawn by Tallystep (mfd. by Taylor-Hobson Co.). A cutoff of 0.17 mm, needle pressure of 2 mg, and 0.1×2.5 μm needle were used.

We claim:

1. A magnetic recording medium comprising a magnetic layer formed on a plastic base and having a perpendicular magnetic anisotropy suited for perpendicular magnetization, a back coating being formed on the side of the base opposite the magnetic side, said back coating being a thermoset coating cured from a thermosetting composition comprising a vinyl chloride-vinyl acetate-vinyl alcohol copolymer, a polyurethane resin, and a polyisocyanate, or a radiation-cured coating cured from a radiation-curable composition containing at least one component having at least one acrylic, maleic, or allylic double bond, said back coating having an asperity in the range of 0.04 to 0.6 μm and wherein the asperity of the magnetic layer is of not more than 0.08 μm.

2. A magnetic recording medium according to claim 1, wherein said back coating contains one or more fillers selected from the group consisting of electrically conductive fine particles, inorganic fine particles and lubricant particles.

3. A magnetic recording medium according to claim 2, wherein the electrically conductive particles are contained in the ratio of 20–200 parts by weight per 100 parts of the copolymer and polyurethane resin and the inorganic or lubricant particles are contained in the ratio of 10–300 parts per 100 parts of the copolymer and polyurethane resin.

4. A magnetic recording medium according to any of claims 1–3, wherein said thermosetting composition comprises 10-80% by weight of the vinyl chloride-vinyl acetate-vinyl alcohol copolymer and 90-20% by weight of the polyurethane and 5-80% by weight of the polyisocyanate based on the total amount of the copolymer and the polyurethane.

5. A magnetic recording medium according to any of claims 1-3, wherein the thermosetting composition comprises 15-60% by weight of the nitrocellulose, 15-60% by weight of the vinyl chloride-vinyl acetate-vinyl alcohol copolymer, 10-70% by weight of the polyurethane and 5-80% by weight of polyisocyanate, all based on the total amount of the nitrocellulose, the copolymer and the polyurethane.

6. A magnetic recording medium according to any of claims 1-3, wherein the radiation-curable composition further contains at least one thermoplastic elastomer or its prepolymer.

7. Magnetic recording medium according to any of claims 1-3, wherein said at least one radiation-curable component is selected from unsaturated polyester resins, radiation sensitized resins, saturated resins, polyvinyl alcohol resins, epoxy resins, phenoxy resins and cellulose derivatives.

8. Magnetic recording medium according to claim 6, wherein said elastomer is selected from polyurethane elastomers, prepolymers and telomers, acrylonitrilebutadiene copolymer elastomers, and polybutadiene elastomers.

9. A magnetic recording medium according to claim 1, wherein the thermosetting composition further comprises nitrocellulose.

10. A magnetic recording medium according to claim 2, wherein the electrically conductive fine particles are selected from the group consisting of graphite and carbon black.

11. A magnetic recording medium according to claim 2, wherein the inorganic fine particles are selected from a group consisting of $SiO_2$, $TiO_2$, $Al_2O_3$, $Cr_2O_3$, SiC, $CaCO_3$, ZnO, goethite, $\alpha Fe_2O_3$, talc, kaolin, $CaSO_4$ and boron nitride.

12. A magnetic recording medium according to claim 2, wherein the lubricant particles are selected from the group consisting of Teflon powder, graphite fluoride and molybdenum disulfide.

13. A magnetic recording medium according to claim 7, wherein the radiation sensitized resin is a vinyl chloride-based copolymer.

* * * * *